United States Patent Office 3,552,108
Patented Jan. 5, 1971

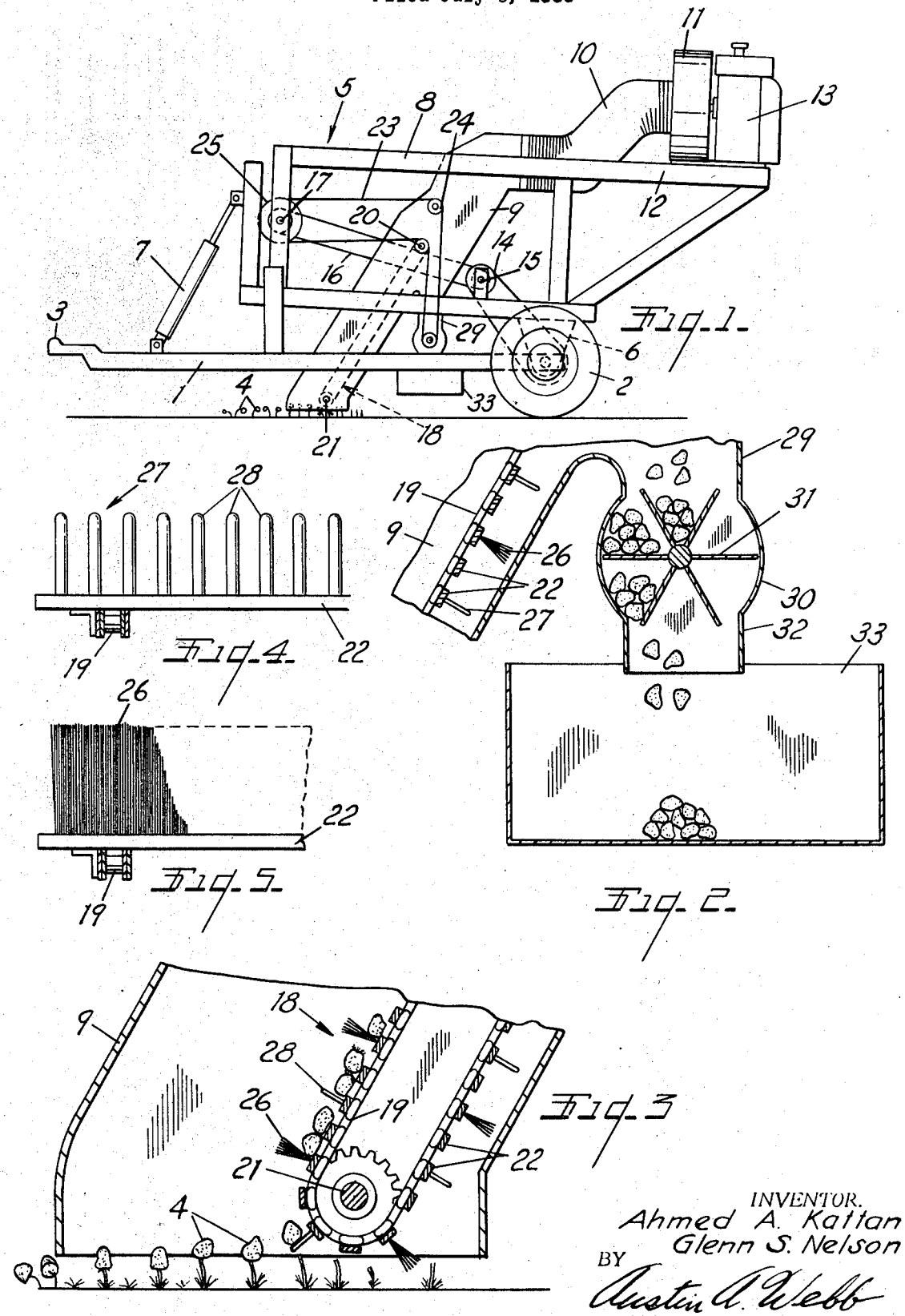

3,552,108
BERRY HARVESTING MACHINE
Ahmed A. Kattan and Glenn S. Nelson, Fayetteville, Ark., assignors to Blueberry Equipment, Inc., South Haven, Mich.
Filed July 3, 1968, Ser. No. 742,356
Int. Cl. A01g 19/00
U.S. Cl. 56—330                              10 Claims

ABSTRACT OF THE DISCLOSURE

A mobile carriage supports a suction hood to advance the open lower end of the hood in closely spaced relation over the plant bed. A blower on the carriage sucks air through the hood at 6000 FPM to lift the berries off the ground. A series of picking combs are advanced around a conveyor in the hood to pull the berries from their stems. Brushes alternated between the picking combs sweep away foliage and assist the air flow in lifting the berries upright. The conveyor discharges the berries into a rotating air lock valve from where they are discharged to a receiving container.

OUTLINE OF INVENTION

The machine permits mechanized harvesting of low crops, such as strawberries by creating localized suction and high air velocity over the plant bed to lift the berries off of the ground and hold them upright on their stems. A picking element located in the suction area passes between the berries and the ground to separate the berries from the plants. The picking element is associated with transfer or conveying means which carry the picked berries to a delivery point where they are moved out of the suction area and air blast to a receiving container.

The drawings, of which there is one sheet, illustrate a practical example and preferred form of the invention.

FIG. 1 is a side elevational view of the machine.

FIG. 2 is a fragmentary, enlarged, vertical cross sectional view through the air lock discharge from the suction hood of the machine.

FIG. 3 is a fragmentary, enlarged, vertical longitudinal cross sectional view through the lower end of the suction hood and the picking conveyor.

FIG. 4 is an enlarged, fragmentary, cross sectional view through the picking conveyor in FIGS. 1–3, illustrating one of the picking elements in elevation.

FIG. 5 is an enlarged, fragmentary, cross sectional view through the picking conveyor in FIGS. 1–3, illustrating one of the berry lifting elements in elevation.

The harvester of the invention comprises a mobile carriage having side frame members 1 supported at the rear by the wheels 2. A hitch 3 is adapted to be connected to a towing tractor for drawing the harvester in straddling relation over a crop row of strawberry plants 4.

A box-like frame 5 is pivotally supported by suitable brackets 6 to swing about the axis of the wheels. A hydraulic cylinder 7 connected between the front of the carriage and the front of the frame 5 permits the elevation of the frame above the ground to be closely controlled.

Supported between the side members 8 of the frame is an inclined suction hood 9 that spans the width of the crop row. The lower end of the hood opens to the surface of the crop row while the upper end is connected to a flexible suction pipe 10. The pipe 10 connects to the suction side of a centrifugal blower 11. The blower 11 is mounted on an upper rear extension 12 of the frame. A gasoline engine indicated conventionally at 13 drives the blower.

A first drive chain 14 is driven from one of the ground wheels 2 and extends to a jack shaft 15 on the middle of the frame. A second chain 16 drives a cross shaft 17 from the jack shaft.

Mounted within the lower end of the suction hood is a picking conveyor indicated generally at 18. The conveyor consists of side chains 19 trained around sprockets on an upper drive shaft 20 and a lower idler shaft 21. The chains are connected by cross bars 22 spaced along the chains. A drive chain 23 extends from the cross shaft over an idler pulley 24 and a drive sprocket 25 on the shaft 17 to the shaft 20.

The cross bars 22 carry alternate brush elements 26 and combs 27, with a vacant or empty cross bar between each comb and brush. The combs 27 have fingers 28 that pick the fruit or individual berries from the plants. The brushes 26 are slightly longer than the fingers of the combs. The conveyor is rotated by the chains 19 to sweep the ends of the brush elements 26 forwardly over the plant bed, in closely spaced relation to the ground.

Intermediate of its ends, the back side of the suction hood 9 branches downwardly in an outlet branch 29. The branch 29 opens into a cylindrical air trap chamber 30 with a vaned rotor 31 therein. The rotor is turned by the chain 23 so that berries delivered from the upper end of the conveyor 18 fall through the branch 29 into the trap chamber. The vanes of the rotor continually advance berries to the delivery throat 32, from where they fall to a suitable container 33 removably supported on the carriage 1 or the frame 5, while the vanes prevent the entrance of air through the branch 29 to reduce the suction effect of the blower 11.

The fingers 28 of the combs are a little over an inch long and three-sixteenths of an inch in diameter. They are spaced apart by about four-tenths of an inch so as to straddle the stems of berries and pull the berries off of the plants. The lower end of the hood 9 is adjusted to about one and one-quarter inches from the ground, and the conveyor 8 is positioned so that the fingers clear the ground and do not dig up the plants.

The brush like lifting elements 26 are a little over an inch and a half long, so that as they are moved by the conveyor and movement of the carriage, they lightly brush the surface of the ground. The drive to the conveyor is geared to the ground wheels in a ratio that will cause the brush element to sweep about two inches of the bed. The brush elements function to lift up berries which the vacuum alone has not raised to upright position. The following picking element then picks the berries. In using the harvester, it is desirable to cut the foliage above the berries before the harvesting operation. The brush elements also act to brush away the foliage from over the berries.

What is claimed as new is:

1. A harvesting machine for low ground crops such as strawberries comprising,
    a mobile carriage having ground engaging wheels,
    an upright suction hood extending transversely between the sides of said carriage and having an open lower end,
    a power driven blower mounted on said carriage and having the upper end of said hood connected to its intake side,
    a picking conveyor positioned within said hood with the lower end of the conveyor located at the open lower end of the hood,
    picking elements carried in transversely extending relation on said conveyor and movable by the conveyor across the surface of the ground,
    an outlet branch opening from said hood below the discharge end of said conveyor,
    an air trap in said outlet branch,
    a support for a receiving container positioned below said outlet branch, and drive means connected to drive said conveyor in timed relation to movement of said carriage.

2. A harvesting machine as defined in claim 1 in which said conveyor is mounted in upwardly and rearwardly inclined position, said drive means being arranged to advance said picking elements over the ground in the same direction as the movement of said carriage.

3. A harvesting machine as defined in claim 1 in which said picking elements are comb-like teeth projecting from said conveyor and advanced thereby in spaced relation to the ground.

4. A harvesting machine as defined in claim 3 in which there are fruit lifting elements carried by said conveyor between said picking elements and advanced by the conveyor in sweeping contact with the plant bed being harvested.

5. A harvesting machine as defined in claim 4 in which said fruit lifting elements are brushes with bristles projecting outwardly from the conveyor.

6. A harvesting machine as defined in claim 1 in which said hood is vertically adjustable on said carriage to maintain its lower end at about 1½ inches from the ground.

7. A harvesting machine as defined in claim 6 in which said blower creates an air velocity in excess of 5500 feet per minute into the lower end of said hood.

8. A harvesting machine as defined in claim 1 in which said conveyor is driven at a speed relative to the ground speed of said vehicle to move said picking elements over from 1½ to 2½ inches of ground as the elements advance around the lower end of the conveyor.

9. A harvesting machine as defined in claim 8 in which said picking elements move in the same direction as said carriage in moving over the ground.

10. A harvester for picking strawberries comprising a mobile carriage, a suction hood mounted on said carriage and having an open lower end extending transversely of the carriage in closely spaced relation to the ground, a blower connected to draw air at high velocity through said open lower end of said hood, a conveyor mounted in said hood and having transversely extending cross bars with spaced teeth thereon and projecting below said hood and spaced rearwardly from the leading side of said hood, an outlet passage formed in said hood and arranged to receive berries from said conveyor, and an air trap in said outlet passage adapted to discharge berries through said outlet passage without admitting air to the suction hood.

References Cited
UNITED STATES PATENTS

| | | | |
|---|---|---|---|
| 1,220,132 | 3/1917 | Jenkins | 56—19 |
| 1,784,702 | 12/1930 | Morano | 56—330 |
| 2,445,162 | 7/1948 | Wallace | 56—330X |
| 2,696,706 | 12/1954 | Getsinger | 56—330 |
| 3,182,437 | 5/1965 | Ramacher et al. | 56—328 |
| 3,303,638 | 2/1967 | Koehn | 56—330 |

LOUIS G. MANCENE, Primary Examiner

JAY N. ESKOVITZ, Assistant Examiner

U.S. Cl. X.R.

56—328